Patented Aug. 27, 1929.

1,726,482

UNITED STATES PATENT OFFICE.

BERTHOLD GERNHARDT, OF BERLIN, GERMANY.

RAPID PROCESS FOR THE AUTOMATIC PRODUCTION OF INSPISSATED SUGAR FRUITS.

No Drawing. Original application filed August 29, 1927, Serial No. 216,311. Divided and this application filed August 9, 1928. Serial No. 298,622.

This invention relates to a rapid process for the production of inspissated sugar fruits which has formed part of my copending application 216,311, filed August 29, 1927, and has for its object to provide an improved method for the preparation of these products.

It has been proposed heretofore to preserve fruit in sugar by preliminarily washing and then digesting the fruit in steam and thereafter treating it with successive charges of strong syrup under high pressure and desiccating it.

The present invention consists in stewing the fruits in a closed vessel with water and then treating it in the same vessel under high pressure of carbon dioxide with a sugar solution containing 66% of sugar and produced by dissolving sugar in cold water.

The entire working process takes place with exclusion of atmospheric air in a closed vessel in approximately 24 hours, the fruits being treated, directly after the stewing, with a sugar-solution, containing 66% of sugar and produced by dissolving sugar in cold water, in a separate closed vessel communicating by pipes with the first closed vessel. This sugar-solution comprising a high percentage of sugar is submitted to carbon-dioxide pressure regulated, according to the kind of fruits, up to 10 atms., so that the sugar-solution penetrates into the fruits. The inspissated sugar depositing by gravity on the bottom of the boiler is withdrawn from time to time and returned into the boiler at the top-end of the same in order to obtain a consistency of the solution as uniform as possible over the entire height of the boiler. This is done by a periodically adjustable electro-automatic operation of the control elements by circulating, after shutting off the carbon dioxide pressure, the sugar solution in the vessel by means of a liquid pump, the pressure beginning again to act as soon as the liquid pump is stopped. In this manner the process can be carried out continually without special attendance.

The fruits treated according to the process preserve their natural aroma, as, during the treatment, they do not come into contact with the atmospheric air. They preserve their colour and transparence as the sugar-solution, being not boiled, cannot caramelize as it is produced by cold process; the fruits thus treated are of unlimited durability as the sugar-solution, which is under high pressure, traverses the fruits completely and consequently preserves the same; they preserve their natural shape as, placed side by side, they are at rest during the whole process owing to the regulating devices which are provided, destruction of the chlorophyll by exceeding the critical temperatures during stewing being avoided.

I claim:—

A process for the production of inspissated sugar fruits consisting in placing the fruits in a closed vessel, stewing them therein with water and then treating them in the same vessel under high pressure of carbon dioxide with a sugar solution containing 66% of sugar and produced by dissolving sugar in cold water.

In testimony whereof I affix my signature.

BERTHOLD GERNHARDT.